US009563100B2

(12) United States Patent
Masuyama et al.

(10) Patent No.: US 9,563,100 B2
(45) Date of Patent: Feb. 7, 2017

(54) OPTICAL SEMICONDUCTOR DEVICE AND METHOD OF PRODUCING THE SAME

(71) Applicant: SUMITOMO ELECTRIC INDUSTRIES, LTD., Osaka (JP)

(72) Inventors: Ryuji Masuyama, Kamakura (JP); Naoya Kono, Yokohama (JP); Daisuke Kimura, Yokohama (JP); Hirohiko Kobayashi, Machida (JP); Takamitsu Kitamura, Fujisawa (JP); Hideki Yagi, Machida (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 14/807,501

(22) Filed: Jul. 23, 2015

(65) Prior Publication Data

US 2016/0026064 A1    Jan. 28, 2016

(30) Foreign Application Priority Data

Jul. 25, 2014   (JP) .................................. 2014-152004

(51) Int. Cl.
*G02F 1/025*   (2006.01)
*G02F 1/225*   (2006.01)
(Continued)

(52) U.S. Cl.
CPC ............ *G02F 1/2257* (2013.01); *G02F 1/025* (2013.01); *G02F 1/2255* (2013.01); *G02B 6/132* (2013.01);
(Continued)

(58) Field of Classification Search
None
See application file for complete search history.

(56) References Cited

U.S. PATENT DOCUMENTS 5,276,744 A  *  1/1994  Shaw .................... G02F 1/3134
                                                    385/11
5,359,449 A  *  10/1994  Nishimoto ........... G02F 1/0123
                                                    359/245
(Continued)

FOREIGN PATENT DOCUMENTS

JP      2007-180425      7/2007

*Primary Examiner* — Michelle R Connelly
(74) *Attorney, Agent, or Firm* — Smith, Gambrell & Russell, LLP.

(57) ABSTRACT

An optical semiconductor device including: a substrate having a principal surface; first and second optical waveguides disposed on the principal surface of the substrate, the first and second optical waveguides extending in a first direction, the second optical waveguide being arranged adjacent to the first optical waveguide in a second direction intersecting with the first direction; first and second signal electrodes disposed on the first and second optical waveguides; a resistor disposed on the principal surface, the resistor being arranged between the first optical waveguide and the second optical waveguide, the resistor being electrically connected to the first signal electrode and the second signal electrode; a resin layer disposed on the principal surface, top surfaces of the first and second signal electrodes, and the resistor; and a capacitor disposed on the resin layer, the capacitor being electrically connected to the resistor through an opening of the resin layer.

10 Claims, 9 Drawing Sheets

(51) Int. Cl.
*G02B 6/132* (2006.01)
*G02F 1/21* (2006.01)
*G02B 6/136* (2006.01)

(52) U.S. Cl.
CPC ......... *G02B 6/136* (2013.01); *G02F 2001/212* (2013.01); *G02F 2201/12* (2013.01)

(56) References Cited

U.S. PATENT DOCUMENTS

| | | | |
|---|---|---|---|
| 6,522,792 B1* | 2/2003 | Sugamata | G02F 1/0356 385/129 |
| 7,263,244 B2* | 8/2007 | Tanaka | G02F 1/2255 385/14 |
| 8,655,116 B2* | 2/2014 | Ishimura | G02F 1/025 359/238 |
| 2012/0328227 A1* | 12/2012 | Hara | G02F 1/0121 385/3 |
| 2015/0063809 A1* | 3/2015 | Sugiyama | H04J 14/06 398/65 |
| 2016/0011439 A1* | 1/2016 | Kitamura | G02F 1/218 385/2 |
| 2016/0026063 A1* | 1/2016 | Yagi | G02F 1/2255 385/2 |
| 2016/0062207 A1* | 3/2016 | Bai | G02F 1/225 385/3 |

* cited by examiner

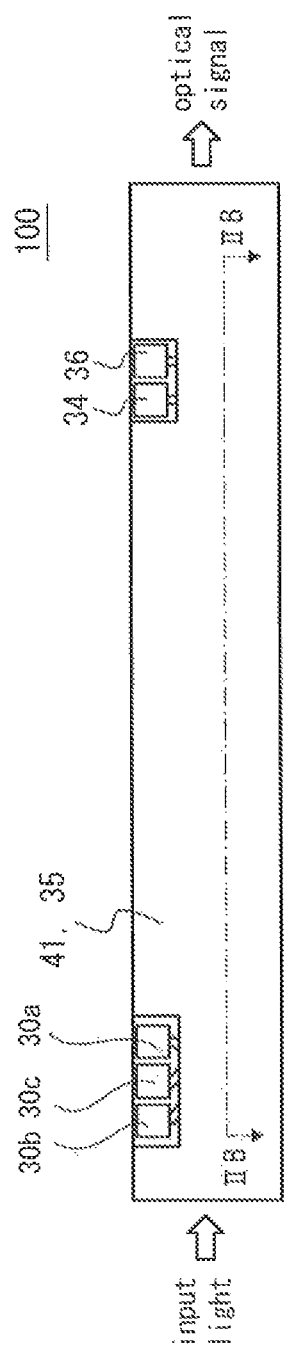
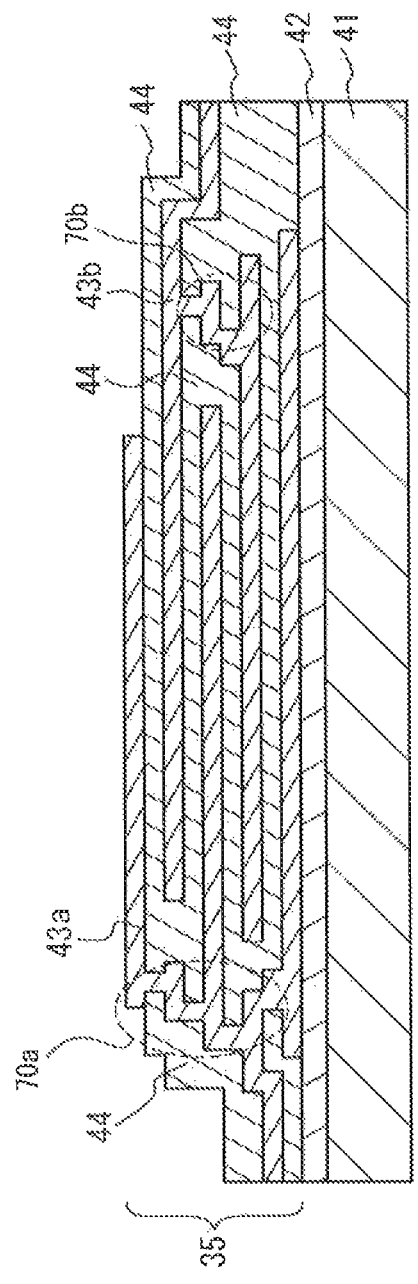
FIG. 2A
FIG. 2B

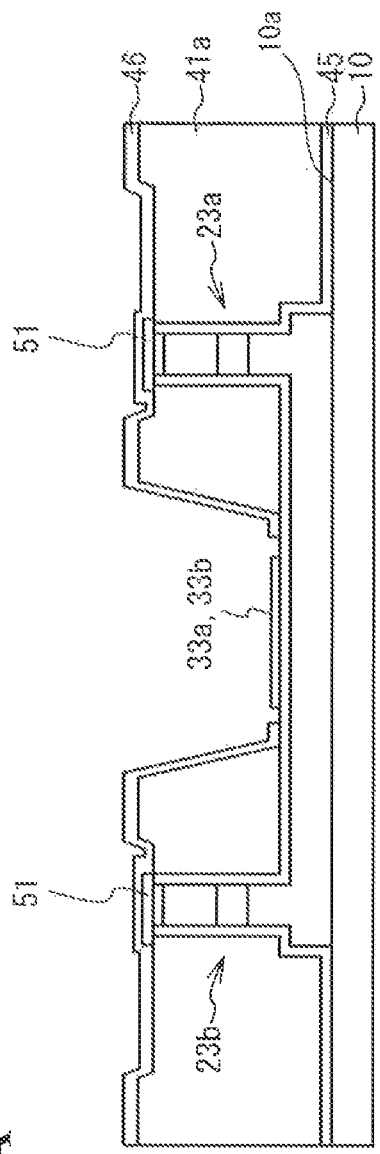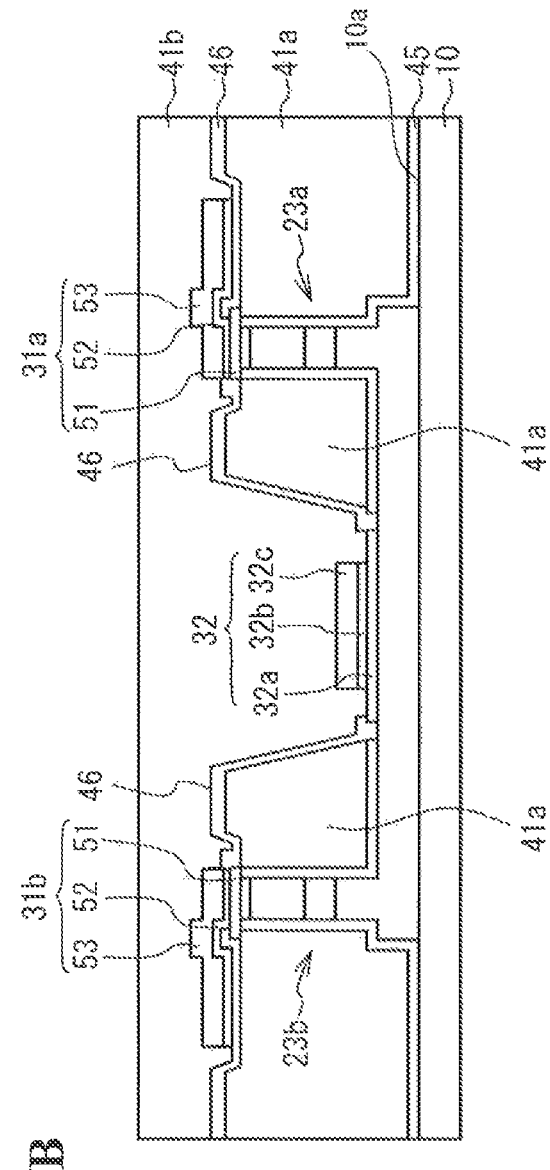

OPTICAL SEMICONDUCTOR DEVICE AND METHOD OF PRODUCING THE SAME

BACKGROUND OF THE INVENTION

1. Field of the Invention

The present invention relates to an optical semiconductor device and a method of producing the same, 2. Description of the Related Art Japanese Unexamined Patent Application Publication No. 2007-180425 (Patent Literature 1) discloses a semiconductor device including a capacitor and an optical element monolithically integrated on a single substrate. The capacitor is used to eliminate noise components in electrical signals applied to the semiconductor device. Noise components are transmitted from the outside of the semiconductor device and reach the semiconductor device through an electrical line. If the elimination of the noise components by the capacitor is insufficient, a malfunction occurs in the optical element of the semiconductor device. In order to sufficiently eliminate noise components having high frequencies, a capacitor having a large capacitance is desired.

SUMMARY OF THE INVENTION

In the semiconductor device in Patent Literature 1, an electrode pad for applying a bias voltage to the optical element is integrated in addition to the capacitor and the optical element. The capacitor is arranged in a remaining region of the semiconductor device other than the regions of the optical element and the electrode pad. Consequently, the area of the capacitor is restricted by the areas of the optical element and the electrode pad. The capacitance of a capacitor which is proportional to the area is also restricted. In the semiconductor device of Patent Literature 1, the capacitor has a capacitance of about 0.1 nF. It is difficult to monolithically integrate a capacitor having a large capacitance together with an optical element.

Accordingly, the semiconductor device according to the present invention is an optical semiconductor device including: a substrate having a principal surface and a back surface opposite to the principal surface; a first optical waveguide disposed on the principal surface of the substrate, the first optical waveguide extending in a first direction; a second optical waveguide disposed on the principal surface of the substrate, the second optical waveguide extending in the first direction, the second optical waveguide being arranged adjacent to the first optical waveguide in a second direction intersecting with the first direction; a first signal electrode disposed on the first optical waveguide; a second signal electrode disposed on the second optical waveguide; a resistor disposed on the principal surface of the substrate, the resistor being arranged between the first optical waveguide and the second optical waveguide, the resistor being electrically connected to the first signal electrode and the second signal electrode; a resin layer disposed on the principal surface of the substrate, top surfaces of the first and second signal electrodes, and the resistor; and a capacitor disposed on the resin layer, the capacitor being electrically connected to the resistor through an opening of the resin layer.

In this optical semiconductor device, the resin layer is disposed on the principal surface of the substrate, top surfaces of the first and second signal electrodes, and the resistor. The capacitor is disposed on the resin layer. The resin layer covers the optical waveguide and the signal electrode. The resin layer has a substantially flat surface. As the capacitor can be arranged on the resin layer without interfering with the optical waveguide and the signal electrode, the area of the capacitor can be increased. The capacitance of the capacitor can, therefore, be increased without increasing the area of the optical semiconductor device.

The method of producing an optical semiconductor device according to the present invention includes the steps of: forming an optical waveguide on a principal surface of a substrate; forming a signal electrode on the optical waveguide; forming a resistor on the principal surface of the substrate; forming a resin layer on the principal surface of the substrate, a top surface of the signal electrode, and the resistor; forming an opening in the resin layer; and forming a capacitor on the resin layer. The step of forming the capacitor includes a step of forming a first metal layer, a second metal layer and an insulating film disposed between the first metal layer and the second metal layer. The first metal layer of the capacitor is connected to the resistor through the opening of the resin layer.

BRIEF DESCRIPTION OF THE DRAWINGS

FIG. 2A is a schematic top view of the modulator device provided with a capacitor embedded in a resin; and FIG. 2B is a cross-sectional view taken along the line IIB-IIB of FIG. 2A and is a schematic cross-sectional view of the portion higher than the resin layer.

FIGS. 7A and 7B are cross-sectional views illustrating the production method.

DESCRIPTION OF THE PREFERRED EMBODIMENTS

Figure 1A:
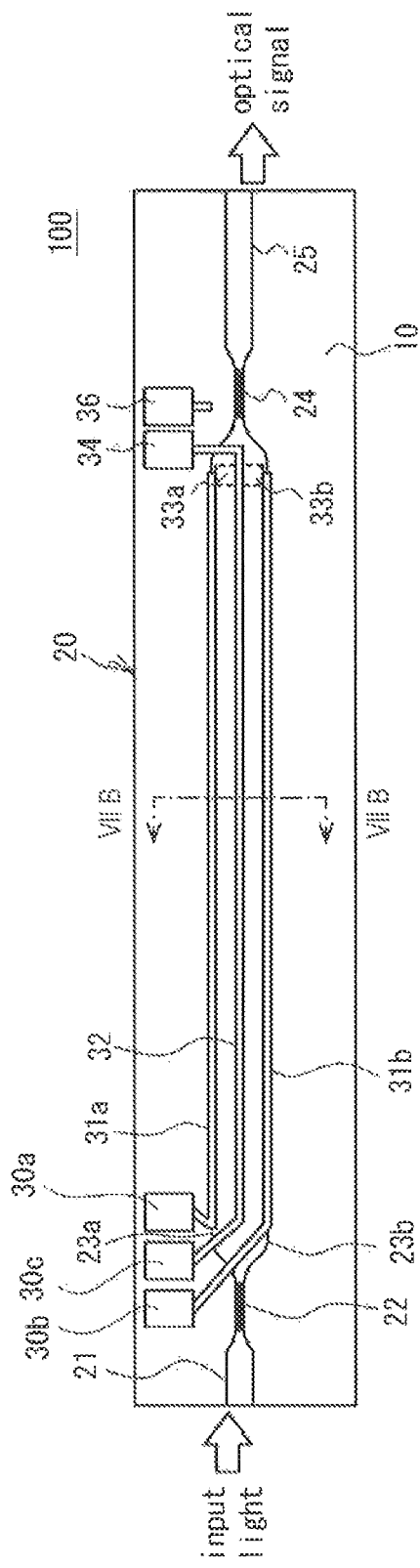
FIG. 1A is a schematic top view of a modulator device according to an embodiment.

First, the details of an embodiment of the present invention will be listed and described.

The present invention relates to an optical semiconductor device including a substrate having a principal surface and a back surface opposite to the principal surface; a first optical waveguide disposed on the principal surface of the substrate, the first optical waveguide extending in a first direction; a second optical waveguide disposed on the principal surface of the substrate, the second optical waveguide extending in the first direction, the second optical waveguide being arranged adjacent to the first optical waveguide in a second direction intersecting with the first direction; a first signal electrode disposed on the first optical waveguide; a second signal electrode disposed on the second optical waveguide; a resistor disposed on the principal surface of the substrate, the resistor being arranged between the first optical waveguide and the second optical waveguide, the resistor being electrically connected to the first signal electrode and the second signal electrode; a resin layer disposed on the principal surface of the substrate, top surfaces of the first and second signal electrodes, and the resistor; and a capacitor disposed on the resin layer, the capacitor being electrically connected to the resistor through an opening of the resin layer. Since the capacitor is disposed on the resin layer, it is possible to integrate a capacitor with a large area Thus, the capacitor having a large capacitance is obtained.

In the optical semiconductor device of the present invention, the second optical waveguide is arranged at a position apart from the first optical waveguide by a distance, and the capacitor may have a width larger than the distance between the first and second optical waveguides.

The optical semiconductor device of the present invention preferably includes a first inorganic film disposed on the resin layer, and the capacitor is preferably disposed on the first inorganic film so as to be in contact with the first inorganic film. As a result, the presence of the first inorganic film enhances the adhesion between the capacitor and the resin layer.

The optical semiconductor device of the present invention may further include a ground electrode disposed on the principal surface of the substrate, the ground electrode being electrically connected to the capacitor; a back electrode disposed on the back surface of the substrate; a via hole penetrating the substrate from the principal surface to the back surface; and a via electrode disposed in the via hole, the via electrode electrically connecting the ground electrode and the back electrode.

In the optical semiconductor device of the present invention, the capacitor may include a first metal layer disposed on the resin layer, a second metal layer disposed on the first metal layer, and an insulating film disposed between the first metal layer and the second metal layer. The first metal layer may be connected to the resistor, and the second metal layer may be connected to the ground electrode. Consequently, the termination resistor and the ground electrode disposed on the principal surface are connected through the capacitor disposed on the resin layer. On the resin layer, the first metal layer and the second metal layer are insulated from each other with the insulating film. Consequently, the metal layers connected to each other do not short-circuit during being drawn on the resin layer. Since the metal layers connected to each other are laminated with the insulating film interposed therebetween, the area necessary for the connection can be reduced, and the area of the capacitor can be increased. As a result, the capacitance of the capacitor can be increased.

In the optical semiconductor device of the present invention, the capacitor may include a third metal layer, a fourth metal layer, and a plurality of insulating films. The first metal layer, the second metal layer, the third metal layer, and fourth metal layer are stacked in this order. The insulating films are disposed between the first to fourth metal layers. The first metal layer is electrically connected to the third metal layer, the second metal layer is electrically connected to the fourth metal layer, the first metal layer and the third metal layer are connected to the resistor, and the second metal layer and the fourth metal layer are connected to the ground electrode.

The optical semiconductor device of the present invention may include buried layers disposed on side surfaces of the first and second optical waveguides. The first signal electrode and the second signal electrode are disposed on the buried layers.

In the optical semiconductor device of the present invention, the first and second optical waveguides may constitute a pair of arm waveguides of a Mach-Zehnder modulator, and the first and second signal electrodes may constitute a pair of traveling-wave electrodes of the Mach-Zehnder modulator.

The present invention relates to a method of producing an optical semiconductor device. The method includes the steps of: forming an optical waveguide on a principal surface of a substrate; forming a signal electrode on the optical waveguide; forming a resistor on the principal surface of the substrate; forming a resin layer on the principal surface of the substrate, a top surface of the signal electrode, and the resistor; forming an opening in the resin layer; and forming a capacitor on the resin layer. The step of forming the capacitor includes a step of forming a first metal layer, a second metal layer and an insulating film disposed between the first metal layer and the second metal layer. The first metal layer of the capacitor is connected to the resistor through the opening of the resin layer. Since the capacitor is formed on the resin layer, it is possible to integrate a capacitive element having a high capacitance while inhibiting an increase in the area of the device.

The production method of the present invention may include a steps of: forming a via hole passing through the substrate by etching the substrate; forming a via electrode in the via hole; and forming a back electrode on a back surface of the substrate.

An optical semiconductor device and a method of producing the device according to an embodiment of the present invention will now be specifically described with reference to the drawings. The present invention is not limited to the following examples, and is defined only by claims and is intended to include all modifications that are within the meaning and scope equivalent to the claims.

A modulator device will now be described as an example of the optical semiconductor device. FIG. 1A is a schematic top view of the modulator device 100 according to an embodiment. The modulator device 100 includes a Mach-Zehnder modulator 20 constituted of mesa-shaped optical waveguides disposed on a substrate 10. The Mach-Zehnder modulator 20 includes an input waveguide 21, two optical couplers 22 and 24, two arm waveguides 23a and 23b, and an output waveguide 25. The input waveguide 21 receives light from outside of the device 100. The optical coupler 22 divides light from the input waveguide 21 and provide lights to the arm waveguides 23a and 23b. The optical coupler 24 combines lights from the arm waveguides 23a and 23b. The output waveguide 25 receives light from the optical coupler 24 and output optical signal to the outside. In the example shown in FIG. 1A, the optical couplers 22 and 24 are 2×2 MMI couplers. The arm waveguides 23a and 23b each have a length of, for example, 3 mm.

The Mach-Zehnder modulator 20 includes a variety of electrodes. A signal electrode 31a is disposed on the arm waveguide 23a. A signal electrode 31b is disposed on the arm waveguide 23b. A reference electrode 32 is arranged between the signal electrode 31a and the signal electrode 31b. A bias electrode 34 and a ground electrode 36 are disposed on the substrate 10. Termination resistors 33a and 33b are disposed on the substrate 10. A capacitor 35 (illustrated FIG. 2A) is disposed above the optical waveguides of Mach-Zehnder modulator 20. The signal electrode 31a is connected to the reference electrode 32 and the bias electrode 34 via the termination resistor 33*a*. The signal electrode 31*b* is connected to the reference electrode 32 and the bias electrode 34 via the termination resistor 33*b*. The reference electrode 32 is connected to the bias electrode 34. The bias electrode 34 is connected to the ground electrode 36 via the capacitor 35.

Electrode pads 30*a*, 30*b* and 30*c* are disposed on the substrate 10. The electrode pads 30*a*, 30*b*, and 30*c* are connected to the signal electrodes 31*a*, 31*b* and the reference electrode 32, respectively. A high frequency electrical signal is inputted from the outside to electrode pads 30*a*, 30*b*, and 30*c*. The electrical signal is applied to the arm waveguides 23*a* and 23*b* through the electrodes 31*a*, 31*b*, and 31*c*. The electrical signal causes a refractive index change of the arm waveguides 23*a* and 23*b*. Consequently, the output of light from the output waveguide 25 is modulated to be an optical signal.

Figure 1B:
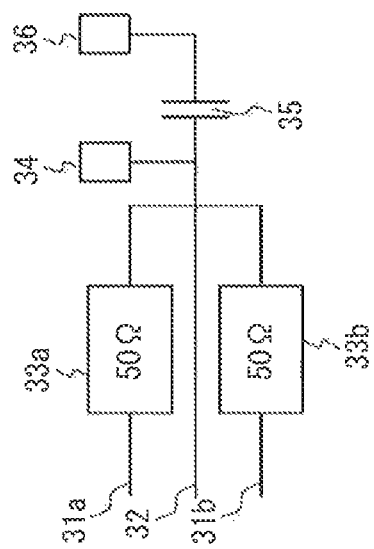
FIG. 1B is a diagram showing electrical connection of components constituting the modulator device.

FIG. 1B shows electrical connection of the modulator device 100. The signal electrodes 31*a* and 31*b* are connected to one ends of the termination resistors 33*a* and 33*b*, respectively. The other ends of the termination resistors 33*a* and 33*b* are connected to the reference electrode 32 and the bias electrode 34. The reference electrode 32, the termination resistors 33*a* and 33*b*, and the bias electrode 34 are connected to the ground electrode 36 with the capacitor 35 interposed therebetween. The reference electrode 32 is applied with a bias voltage from the outside through the bias electrode 34. As a result, the reference electrode 32 is maintained at a predetermined electrical potential. The ground electrode 36 is electrically earthed through an external wiring. The capacitor 35 eliminates noise components, which comes from the external wiring into the ground electrode 36. The electrical potential of the reference electrode 32 is stably maintained by the capacitor 35.

FIG. 2A is a schematic top view of the modulator device. The resin layer 41 and the capacitor 35 are disposed on the Mach-Zehnder modulator 20. As illustrated in FIG. 2A, in the modulator device 100, the resin layer 41 is disposed so as to cover the upper parts of the input waveguide 21, the optical coupler 22, the arm waveguides 23*a* and 23*b*, the optical coupler 24, and the output waveguide 25, which constitute the Mach-Zehnder modulator 20. The resin layer 41 is disposed so as to cover the signal electrodes 31*a* and 31*b*, the reference electrode 32, and the termination resistors 33*a* and 33*b*. The electrode pads 30*a* to 30*c*, the bias electrode 34, and the ground electrode 36 are exposed from the resin layer 41. The resin layer 41 is a bis-benzocyclobutene (BCB) resin. The electrode pads and the electrodes 34 and 36 are exposed from the resin layer 41 and the capacitor 35.

The capacitor 35 is disposed on the resin layer 41, and covers the Mach-Zehnder modulator 20 and the signal electrodes 31*a* and 31*b*. The width of the capacitor 35 is larger than the distance between the arm waveguide 23*a* and the arm waveguide 23*b*. The arm waveguides 23*a* and 23*b* are arranged spaced apart from each other by 0.3 mm. The width of the capacitor 35 is 0.8 mm. The device 100 has an area of 4.0 mm$^2$, and the top surface area of the capacitor 35 is 3.2 mm$^2$.

FIG. 2B is a cross-sectional view taken along the line IIB-IIB of FIG. 2A and is a view schematically illustrating a cross-section of the portion higher than the resin layer 41. As illustrated in FIG. 2B, a first inorganic film 42 is disposed on the resin layer 41, The capacitor 35 is disposed on the first inorganic film 42. The capacitor 35 has a metal-insulator-metal (MIM) structure composed of five metal layers 43 laminated with insulating films 44 disposed therebetween.

The metal layers 43 includes a first metal layer, a second metal layer, a third metal layer, a fourth metal layer and a fifth metal layer stacked in this order on the first inorganic film 42. A plurality of insulating films 44 are disposed between the first to fifth metal layers. The first metal layer is electrically connected to the third metal layer and the fifth metal layer by a first contact hole 70*a*. The first, third and fifth metal layers constitute a first group 43*a*. The second metal layer is electrically connected to the fourth metal layer by a second contact hole 70*b*. The second and fourth metal layers constitute a second group 43*b*. The first and second contact holes 70*a* and 70*b* are provided in the insulating layers 44. The contact holes 70*a* and 70*b* are filled with a metal to connect the metal layers 43. The first contact hole 70*a* and the second contact hole 70*b* are arranged opposite each other across the plane of the metal layers 43. The first and second groups 43*a* and 43*b* are electrically isolated by the plurality of insulating films 43. In the first group 43*a* and the second group 43*b*, the metal layers arranged in comb-like arrays of the both groups are alternately laminated.

The metal layers 43 are made of Au. The first inorganic film 42 is made of SiN. The insulating films 44 are each a SiN film having a thickness of 100 nm. In the example shown in FIG. 2B, the number of the metal layers 43 is five. The first group 43*a* includes three metal layers and the second group 43*b* includes two metal layers. A capacitance of 10 nF is achieved by producing an MIM structure including five metal layers laminated as shown in FIG. 2B in an area of 3.2 mm$^2$. The first group 43*a* is connected to the electrodes 32 and 34, and the second group 43*b* is connected to the electrode 36.

Figure 3A:
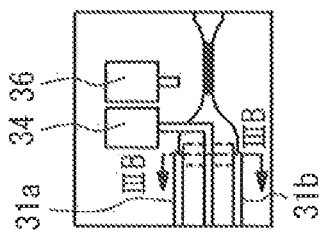
FIG. 3A is an enlarged top view of a part of a Mach-Zehnder modulator.
Figure 3B:
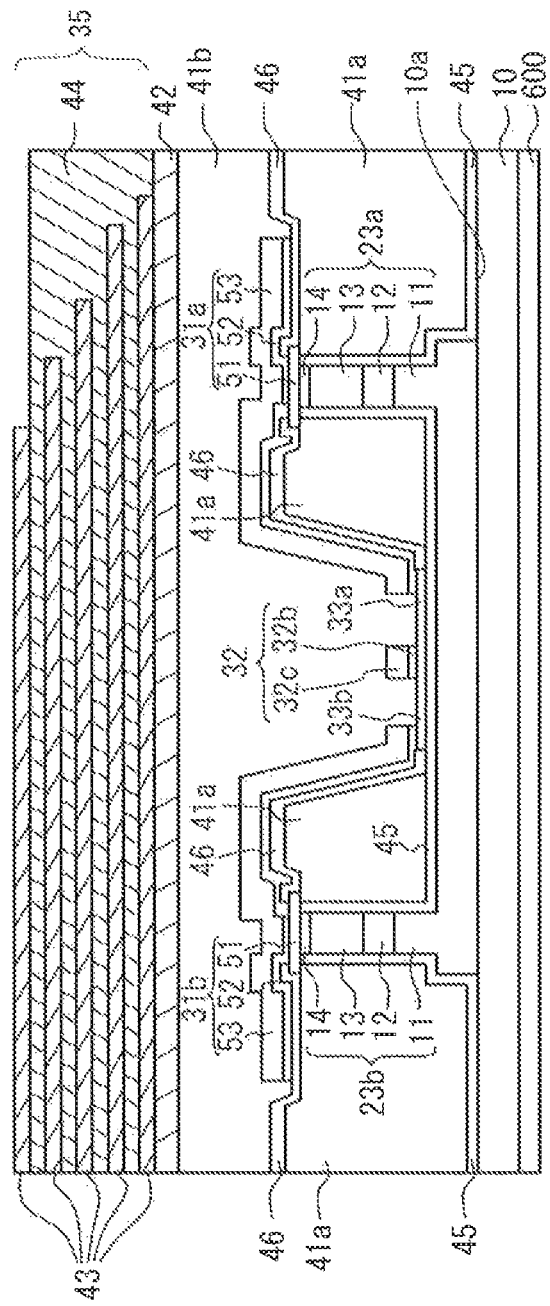
FIG. 3B is a cross-sectional view taken along the line IIIB-IIIB of FIG. 3A.

FIG. 3A illustrates is an enlarged top view of a part of the Mach-Zehnder modulator 20. FIG. 3B is a cross-sectional view taken along the line IIIB-IIIB of FIG. 3A. As illustrated in FIG. 3B, arm waveguides 23*a* and 23*b* are disposed on the principal surface 10*a* of the substrate 10. The arm waveguides 23*a* and 23*b* each have a mesa shape. Buried layers 41*a* are disposed on the side surfaces of the first and second arm waveguides 23*a* and 23*b*. A resin layer 41*b* is disposed on the buried layer 41*a*. The signal electrodes 31*a* and 31*b* are disposed on the arm waveguides 23*a* and 23*b*, and on the buried layers 41*a*. The reference electrode 32 and the termination resistors 33*a* and 33*b* are arranged between the arm waveguides 23*a* and 23*b*. The resin layer 41*b* is disposed on the waveguides 23*a* and 23*b*, the electrodes 31*a*, 31*b*, and 32, and the resistor 33*a* and 33*b*. The capacitor 35 is disposed on the resin layer 41*b* via the first inorganic film 42. The substrate 10 has a back surface on the opposite side to the principal surface 10*a*. On the back surface of the substrate 10, a back electrode 600 is disposed.

The arm waveguides 23*a* and 23*b* include a lower cladding layer 11, a core layer 12, an upper cladding layer 13, and a contact layer 14 stacked in this order on the principal surface 10*a*. The lower cladding layer 11 is disposed from the arm waveguide 23*a* to the arm waveguide 23*b*. The arm waveguides 23*a* and 23*b* are covered with a passivation film 45. The passivation film 45 covers the top surface of the lower cladding layer 11 between the arm waveguide 23*a* and the arm waveguide 23*b*. The termination resistor 33*a* and 33*b* are disposed on the passivation film 45. The electrode 32 a is arranged in the middle of the resistors 33*a* and 33*b*.

The substrate 10 is a semi-insulating InP substrate. The lower cladding layer 11 is made of an n-type InP. The core layer 12 is a multi-quantum well (MQW) composed of alternately laminated non-doped AlGaInAs well layers and AlGaInAs barrier layers. The upper cladding layer 13 is made of a p-type InP. The contact layer 14 is a p-type GaInAs layer. The passivation film 45 is made of SiO$_2$. The termination resistors 33a and 33b are a NiCrSi thin film. The back electrode 600 is made of Au.

The signal electrodes 31a and 31b are disposed on the contact layer 14 so as to be in contact with the contact layer 14. The signal electrodes 31a and 31b each have a structure composed of an ohmic layer 51, a barrier metal layer 52, and a plated layer 53 laminated in this order. The ohmic layer 51 is made of a Ti/Pt/Au stacked layers. The barrier metal layer 52 is a TiW layer. The plated layer 53 is an Au layer.

The buried layer 41a embeds the arm waveguides 23a and 23b. The buried layer 41a has an groove between the arm waveguides 23a and 23b. The resistors 33a and 33b and the electrode 32 are disposed in the bottom of the groove. The signal electrodes 31a and 32b have an elongated portion on the inclined surface of the groove, and connect to the resistors 33a and 33b. The resin layer 41b embeds the electrodes 31a, 31b and 32. The resin layer 41b also embeds the resistors 33a and 33b. A second inorganic film 46 is disposed between the buried layer 41a and the resin layer 41b. The top surface of the resin layer 41b is substantially flat. The capacitor 35 is formed on the flat surface of the resin layer, allowing the capacitor 35 to have a capacitance with high precision as designed. The buried layer 41a is made of a BCB resin. The resin layer 41b is made of a BCB resin. The second inorganic film 46 is made of SiO$_2$.

In the cross-section illustrated in FIG. 3B, a barrier metal layer 32b and a plated layer 32c included in the reference electrode are disposed in this order on the boundary between the termination resistor 33a and the termination resistor 33b. The barrier metal layer 32b and the plated layer 32c constitute a reference electrode 32. The barrier metal layer 32b is made of TiW. The plated layer 32c is made of Au. The reference electrode 32 is located at the central portion of the NiCrSi thin film. Since the reference electrode 32 has a resistance lower than that of the NiCrSi thin film, the two regions of NiCrSi thin film separated by the reference electrode 32 operate as two termination resistors 33a and 33b. The termination resistors 33a and 33b have a resistance of 50 Ω. The thickness and the area of the NiCrSi thin film are determined such that the resistance is 50 Ω.

The buried layer 41a is preferably formed such that the top surface is substantially the same height as that of the top surfaces of the arm waveguides 23a and 23b. The resin layer 41b is preferably formed such that the top surface is higher than the top surfaces of the signal electrodes 31a and 31b. This is based on the following reasons. The arm waveguides 23a and 23b each have a mesa shape having a mesa height of, for example, 2.5 μm and a mesa width of, for example, 1.5 μm. It is difficult to form an electrode so as to be in contact with the top surface of a mesa having such a narrow width. In the present embodiment, the convex portions of the arm waveguides 23a and 23b are embedded in the buried layer 41a such that the top surface of the buried layer 41a and the top surface of the arm waveguide 23a form a substantially flat plane, and that the top surface of the buried layer 41a and the top surface of the arm waveguide 23b form a substantially flat plane. Accordingly, an ohmic layer Si can be easily formed on the flat plane. The convex due to the signal electrodes 31a and 31b and the concave due to the buried layer 41a are embedded in the resin layer 41b to flatten the top surface of the resin layer 41b. Accordingly, the capacitor 35 can be disposed on a flat plane. Thus, the capacitor 35 can be easily formed on a flat surface, allowing the capacitor 35 to have a capacitance with high precision as designed.

Figure 4A:
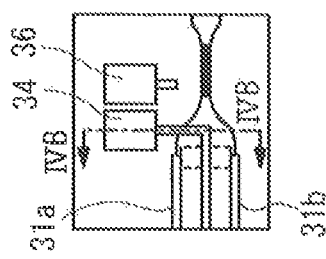
FIG. 4A is an enlarged top view of a part of the Mach-Zehnder modulator.
Figure 4B:
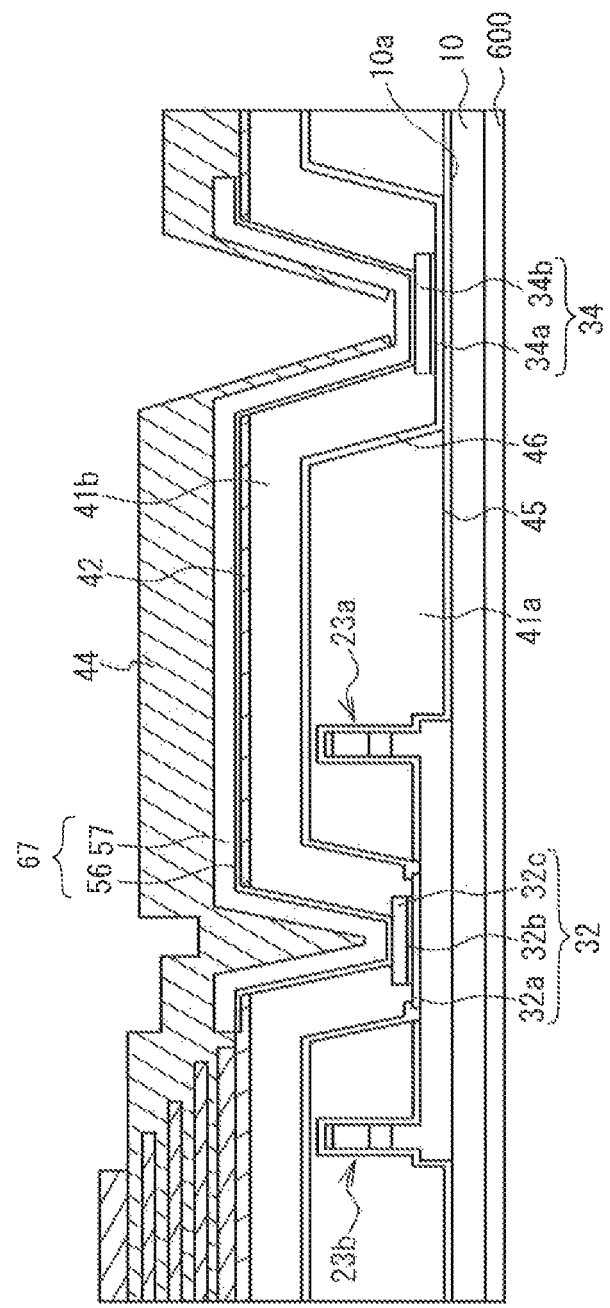
FIG. 4B is a cross-sectional view taken along the line IVB-IVB of FIG. 4A.

FIG. 4A illustrates an enlarged top view of a part of the Mach-Zehnder modulator 20. FIG. 4B is a cross-sectional view taken along the line IVB-IVB of FIG. 4A. In the cross-section illustrated in FIG. 4B, the reference electrode 32 is disposed on the bottom surface of the groove of the buried layer 41a. The reference electrode 32 has a structure including an ohmic layer 32a, a barrier metal layer 32b and a plated layer 32c laminated in this order on the ohmic layer 32a. The ohmic layer 32a is in an ohmic contact with a lower cladding layer 11. The ohmic layer 32a is made of Ti/Pt/Au. A bias electrode 34 is disposed on the outside of the two arm waveguides 23a and 23b. The bias electrode 34 is disposed on the substrate 10 with the passivation film 45 and the second inorganic film 46 interposed therebetween. The bias electrode 34 has a structure including a barrier metal layer 34a and a plated layer 34b laminated in this order. The barrier metal layer 34a is made of TiW. The plated layer 34b is made of Au.

The resin layer 41b has an opening on the bias electrode 34. The bias electrode 34 is electrically connected to the reference electrode 32 through a first connection electrode 67. The first connection electrode 67 extends from the plated layer 32c of the reference electrode 32 to the plated layer 34b of the bias electrode 34 along the inclined surface of the opening of the resin layer 41b. Furthermore, the first connection electrode 67 is connected to the first group 43a of the metal layers 43 of the capacitor 35, extending on the resin layer 41b. The first connection electrode 67 is disposed under the insulating film 44. The first connection electrode 67 has a structure including a barrier metal layer 56 and a plated layer 57 laminated in this order. The barrier metal layer 56 is made of TiW. The plated layer 57 is made of Au.

Figure 5A:
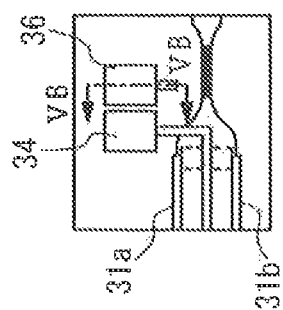
FIG. 5A is an enlarged top view of a part of the Mach-Zehnder modulator.
Figure 5B:
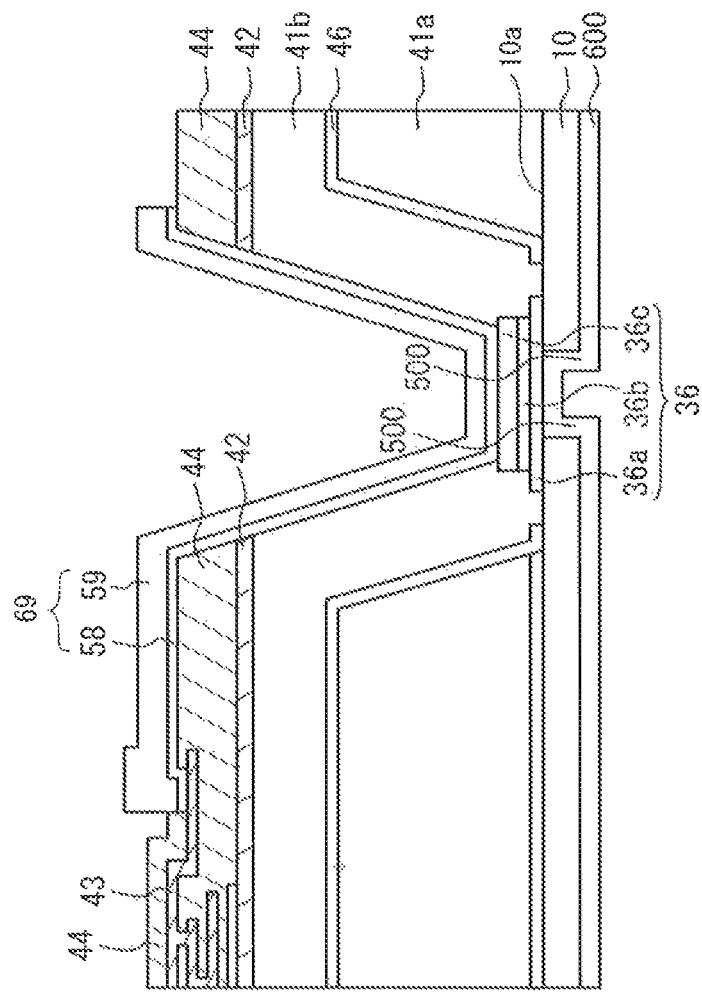
FIG. 5B is a cross-sectional view taken along the line VB-VB of FIG. 5A.

FIG. 5A is an enlarged top view of a part of the Mach-Zehnder modulator 20. FIG. 5B is a cross-sectional view taken along the line VB-VB of Fig, 5A. As shown in FIG. 5A, a ground electrode 36 is disposed on the substrate 10 adjacent to the bias electrode 34 with spacing. As shown in FIG. 5B, the ground electrode 36 is disposed on the bottom surface of an opening formed in the resin layer 41b. The ground electrode 36 has a structure including an ohmic layer 36a, a barrier metal layer 36b, and a plated layer 36c laminated in this order. A part of the ohmic layer 36a is in contact with the substrate 10. The ohmic layer 36a is made of Ti/Pt/Au. The barrier metal layer 36b is made of, TiW. The plated layer 36c is made of Au. The ground electrode 36 is connected to the second group 43b of the metal layers 43 of the capacitor 35 through a second connection electrode 69. The second connection electrode 69 extends from the second group 43b of the capacitor 35 on the insulating film 44. The second connection electrode 69 extends on the inclined surface of the opening of the resin layer 41b and is in contact with the plated layer 36c of the ground electrode 36.

The second connection electrode 69 has a structure including a barrier metal layer 58 and a plated layer 59 laminated in this order. The barrier metal layer 58 is made of TiW. The plated layer 59 is made of Au. The substrate 10 is provided with a via hole having a diameter of 60 μm at the position under the ground electrode 36. A via electrode 500 is disposed on the inner surface of the via hole. The via electrode 500 is in contact with the back surface of the ground electrode 36. The via electrode 500 is made of Au. The ground electrode 36 is electrically connected to the back electrode 600 through the via electrode 500. The back electrode 600 is electrically connected to an external device through, for example, solder and is electrically earthed. That is, the ground electrode 36 is connected to an external device and earthed through the via electrode 500 and the back electrode 600. The ground electrode 36 is electrically connected to an external device without using wire bonding, by disposing the via electrode 500. The via electrode 500 hardly picks up high-frequency noise compared to wire bonding. Consequently, the potential of the ground electrode 36 connected to the capacitor 35 can be further stabilized.

In the present embodiment, the capacitor 35 is disposed on the resin layer 41*b*. The resin layer 41*b* covers the optical waveguides and the electrodes of the Mach-Zehnder modulator 20. Consequently, the area of the capacitor 35 is not restricted by the optical waveguides nor the electrodes. The area of the capacitor 35 can be increased to increase the capacitance of the capacitor 35. Since the region for disposing the capacitor 35 can be longitudinally stacked over the Mach-Zehnder modulator 20, an increase in the device area of the modulator device 100 is not necessary. That is, in the embodiment, the capacitive element having a high capacitance can be integrated while preventing an increase in the area of the device. In addition, a flat base for forming the capacitor 35 can be formed on the optical waveguides by embedding the Mach-Zehnder modulator including the mesa-shaped optical waveguides, in the resin layer 41*b*. Consequently, the breakdown voltage of the capacitor 35 can be uniform. In addition, the capacitance can be increased by using an MIM capacitor as the capacitor and stacking a plurality of metal layers.

The capacitor 35 is preferably disposed on the resin layer 41*b* with the first inorganic film 42 interposed therebetween, because that the adhesion between a metal and an insulating film, such as an inorganic film, is higher than the adhesion between a metal and a resin. Even if the inorganic, film 42 intervenes between the capacitor 35 and the resin layer 41*b*, the resin layer 41*b* can have sufficient flatness.

Figure 6A:
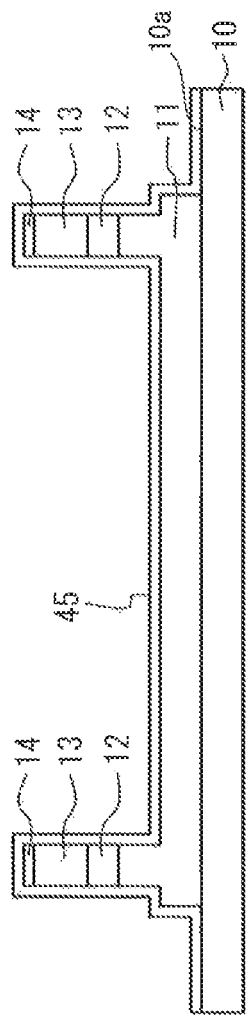
FIGS. 6A and 6B are cross-sectional views illustrating a production method.

Next, a method of producing the modulator device 100 will be described. FIGS. 6A to 9C are cross-sectional views in a process of producing a modulator device according to the present invention. First, a lower cladding layer 11, a core layer 12, an upper cladding layer 13, and a contact layer 14 are epitaxially grown by an organo-metallic vapor phase epitaxy (OMVPE) method on a substrate 10. Then, a mask having a pattern for an optical waveguide is formed on the contact layer 14 by photolithography. The layers from the top surface of the contact layer 14 to the middle of the lower cladding layer 11 are dry etched using the mask. The mesas of optical waveguides are formed by the dry-etching. Subsequently, another mask is formed by photolithography such that the mask covers the lower cladding layer disposed between the two mesas and has openings on the outer side of the mesas. The outside of the mesas is dry etched using this mask until the substrate 10 is exposed. Subsequently, $SiO_2$ is deposited as a passivation film 45 by a chemical vapor deposition (CVD) method. FIG. 6A shows a cross-section crossing the two mesas after the formation of the passivation film 45.

Figure 6B:
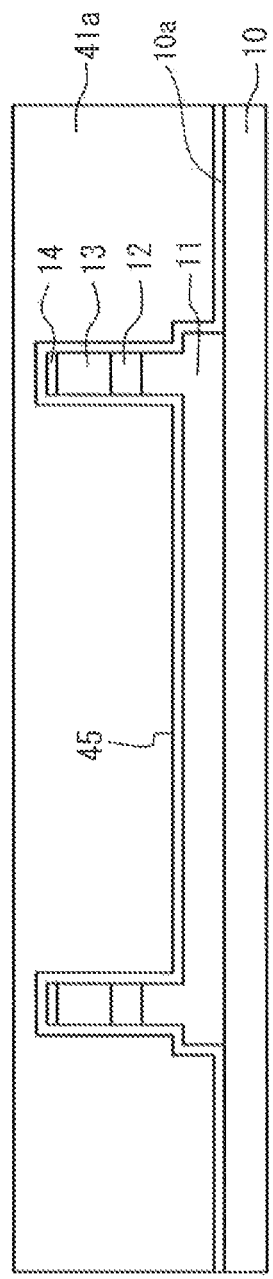

Subsequently, as show in FIG. 6B, a buried layer, such as a BCB resin, is applied onto the passivation film 45 by a spin coating method. The BCB resin is heated and cured to form a buried layer 41*a*. The buried layer 41*a* and the passivation film 45 are then etched to form a groove. Openings are formed by etching the buried layer 41*a* and the passivation film 45 on the contact layers 14 of the arm waveguides 23*a* and 23*b*. The buried layer 41*a* and the passivation film 45 between the arm waveguides 23*a* and 23*b* are also etched to form the groove. An ohmic layer 51 is formed on each arm waveguide in the opening by an evaporation method. The ohmic layer 51 is in contact with the contact layer 14. After the formation of the ohmic layers 51, a second inorganic film 46 is deposited so as to cover the surfaces of the ohmic layer 51, the groove between the arm waveguides, and surfaces of the buried layer 41*a* by a sputtering method.

Subsequently, a termination resistor is formed in the groove between the arm waveguides. FIG. 7A shows a cross-section of the portion where a termination resistor is formed, corresponding to IIIB-IIIB line in FIG. 3A. As shown in FIG. 7A, a NiCrSi film becoming termination resistors 33*a* and 33*b* is deposited on the passivation film 45 in the groove between the arm waveguides.

Next, a reference electrode 32 is formed between the arm waveguides 23*a* and 23*b*. FIG. 7B shows a cross-sectional view taken along the line VIIB-VIIB of FIG. 1 where a reference electrode is formed. In the cross-section of FIG. 7B, the NiCrSi film is not formed in the groove. The groove between the arm waveguides 23*a* and 23*b* shown in FIG. 7B is formed in the etching process shown in FIG. 7A, simultaneously. In the portion of the cross-section of FIG. 7B, the passivation film 45 on the bottom surface of the opening is removed by etching, and the lower cladding layer 11 is exposed between the arm waveguides 23*a* and 23*b*. An ohmic layer 32*a* is formed so as to be in contact with the lower cladding layer 11. The ohmic layer 32*a* is formed by an evaporation method. A barrier metal layer 32*b* is formed on the ohmic layer 32*a*, and a plated layer 32*c* is formed on the barrier metal layer 32*b*. The second inorganic film 46 on the ohmic layer 51 is removed by etching to expose the ohmic layer 51. A barrier metal layer 52 and a plated layer 53 are formed on the ohmic layer 51. The barrier metal layers 32*b* and 52 are formed by a sputtering method. The barrier metal layers 32*b* and 52 may be simultaneously formed in a single process. The plated layers 32*c* and 53 are formed by a plating method. The plated layers 32*c* and 53 may be simultaneously formed. As a result, the signal electrodes 31*a* and 31*b*, the reference electrode 32, and the termination resistors 33*a* and 33*b* are provided.

Subsequently, a resin layer 41*b* is applied by a spin coating method such that the signal electrodes 31*a* and 31*b*, the buried layer 41*a*, the second inorganic film 46, the termination resistors 33*a* and 33*b*, and the reference electrode 32 are embedded therein. Consequently, a resin layer 41 composed of the buried layer 41*a* and the resin layer 41*b* can be formed on the Mach-Zehnder modulator 20. As shown in FIG. 7B, the resin layer 41*b* can have a substantially flat top surface.

In the portion for forming a bias electrode 34 and a ground electrode 36, the resin layer 41*b* is removed by etching using a resist pattern. Openings are formed in the resin layer 41*b*. The openings have bottom surfaces and inclined surfaces connecting the top surface of the resin layer 41*b* to the bottom surfaces. In the opening for forming the bias electrode 34, the second inorganic film 46 is exposed at the bottom surface. A barrier metal layer 34*a* and a plated layer 34*b* constituting the bias electrode 34 are formed on the second inorganic film 46. The barrier metal layer 34*a* is formed by a sputtering method. The plated layer 34*b* is formed by a plating method. In the opening for forming the ground electrode 36, the second inorganic film 46 exposed by removing the resin layer 41*b* is removed by additional etching. In the opening for forming the ground electrode 36, the substrate 10 is exposed at the bottom surface. On the substrate 10, an ohmic layer 36*a*, a barrier metal layer 36*b* and a plated layer 36*c* constituting the ground electrode 36 are formed. The ohmic layer 36*a* is formed by an evaporation method, the barrier metal layer 36b is formed by a sputtering method, and the plated layer 36c is formed by a plating method.

Figure 8:
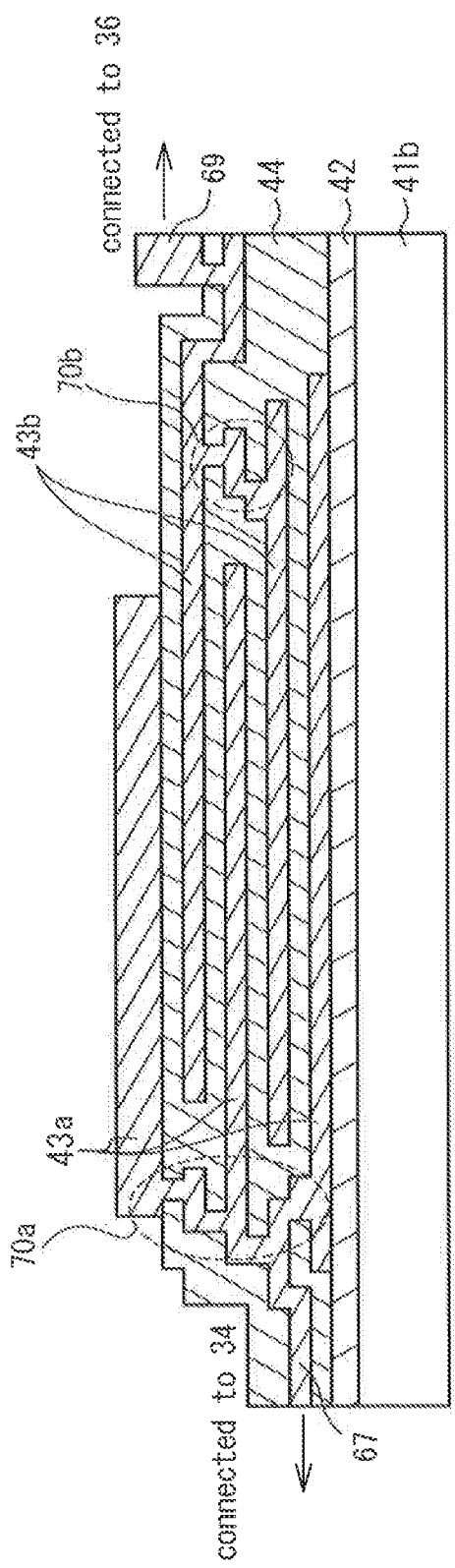
FIG. 8 is a cross-sectional view illustrating the production method.

A method of producing a capacitor 35 will be described. As shown in FIG. 8, a first inorganic film 42 is formed on the resin layer 41b by a sputtering method. Subsequently, a first metal layer 43 of the capacitor 35 is formed on the first inorganic film 42. The first metal layer 43 is formed by combination of an evaporation method, a lift-off method, and a plating method. An insulating film 44 is formed on the first metal layer 43 by a sputtering method. Subsequently, an opening becoming a first contact hole is formed in the insulating film 44 by etching. A second metal layer 43 is formed on the insulating film 44. The second metal layer 43 faces the first metal layer 43 with the insulating film disposed therebetween. In the formation of the second metal layer 43, the second metal layer 43 is also formed inside the first contact bole. Subsequently, an insulating film 44 is formed on the second metal layer 43. Two contact holes are formed in the insulating film 44. The two contact holes are arranged opposite each other across the plane of the insulating film 44. Then a third metal layer 43 is formed on the insulating film 44.

By repeating the formation of a fourth and a fifth metal layers 43, insulating films 44 and contact holes 70a and 70b, a capacitor 35 is obtained. The first metal layer is electrically connected to the third and fifth metal layers by the metal in the first contact hole 70a. The first, third and fifth metal layers constitute a first group 43a of metal layers. The second metal layer is electrically connected to the fourth metal layer by the metal in the second contact hole 70b. The second and fourth metal layers constitute the second group 43b of metal layers. The first and second groups 43a and 43b are electrically isolated each other by the insulating films 44. In each group, a plurality of metal layers 43 are connected by the contact holes. The metal layers 43 arranged in comb-like arrays of the both groups are alternately laminated. The thus-connected, the first group 43a, the second group 43b and the insulating layer 44 function as the capacitor 35.

The connection electrodes are formed during the process of forming the capacitor 35. The first connection electrode 67 connecting the capacitor 35 to the reference electrode 32 and the bias electrode 34 is formed as follows. A barrier metal layer 56 is formed by a sputtering method on the first inorganic film 42 and the inclined surface of the opening of the resin layer 41b in which the bias electrode 34 is disposed. A plated layer 57 is formed on the barrier metal layer 56 by a plating method. Unnecessary parts of the barrier metal layer 56 is removed by etching to process them into the shape of the first connection electrode 67. The surface of the first connection electrode 67 is covered by the insulating films 44. The first group 43a is connected to the first connection electrode 67 by providing the metal layers 43 in a stair-like shape on the outside of the capacitor 35 during the formation of the first and second metal layers 43 of the capacitor 35.

The second connection electrode 69 connecting the capacitor 35 to the ground electrode 36 is formed as follows. A barrier metal layer 58 is formed on the insulating film 44 by a sputtering method. The barrier metal layer 58 is also formed on the inclined surface of the opening of the resin layer 41b in which the ground electrode 36 is disposed. A plated layer 59 is formed on the barrier metal layer 58 by a plating method. The barrier metal layer 58 and the plated layer 59 are processed into the shape of the second connection electrode 69 by etching. The second connection electrode 69 is formed on a plurality of the insulating films 44. As a result of the formation described above, at least one insulating film 44 is present between the first connection electrode 67 and the second connection electrode 69. Accordingly, even if the first connection electrode 67 and the second connection electrode 69 have a crossing portion in a planar view, the first connection electrode 67 and the second connection electrode 69 are vertically isolated from each other by the insulating film 44.

Figure 9A:
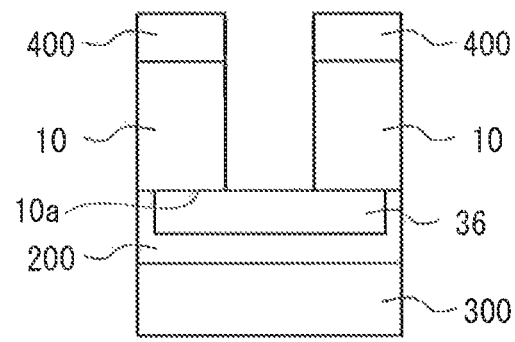
FIGS. 9A to 9C are cross-sectional views illustrating the production method.
Figure 9B:
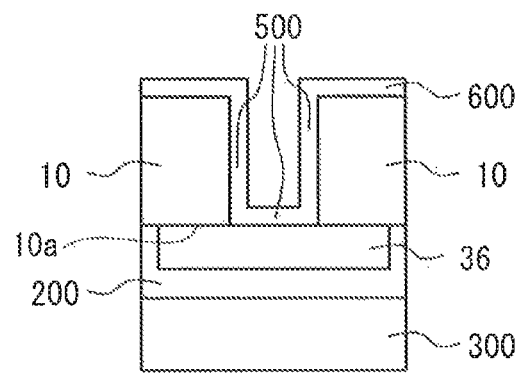
Figure 9C:
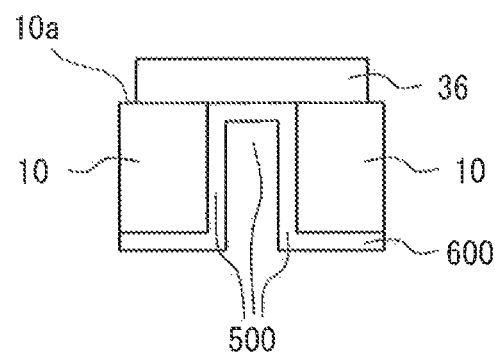

Next, a procedure of forming a via electrode 500 and a back electrode 600 will be described with reference to FIGS. 9A to 9C. FIGS. 9A to 9C are enlarged cross-sectional views showing a vicinity of the ground electrode 36. As shown in FIG. 9A, a bonding member 200, such as wax, is applied onto a principal surface 10a of a substrate 10 on which the ground electrode 36 is formed, and a support substrate 300 is adhered onto the bonding member 200. The support substrate 300 protects the waveguide, the electrode pattern, the capacitor, and other components formed on principal surface 10a, during the process of forming the via electrode 500 and the back electrode 600. A via hole is then formed by dry etching the substrate 10 from the back surface side using a resist pattern 400 formed on the back surface of the substrate 10. The via hole passes through the substrate 10 from the back surface to the principal surface 10a. The back surface of the ground electrode 36 is exposed to the bottom surface of the via hole.

Subsequently, as shown in FIG. 9B, a metal film is formed in the via hole and on the back surface of the substrate 10 by a sputtering method and a plating method. The metal film becomes a via electrode 500 and a back electrode 600. The via electrode 500 is in contact with the ground electrode 36 and electrically connects between the ground electrode 36 and the back electrode 600. Subsequently, as shown in FIG. 9C, the support substrate 300 is peeled off by removing the bonding member 200. Thus, a via electrode 500 and a back electrode 600 are formed by the process described above.

In the production method according to the embodiment, a capacitor 35 can be disposed on a resin layer 41b embedding a Mach-Zehnder modulator 20 and an electrode pattern therein. As a result, the area of the capacitor 35 can be increased. Consequently, the capacitance of the capacitor 35 can be increased. Since there is no need to provide a region for disposing the capacitor 35 separately from the Mach-Zehnder modulator 20, the device area of the modulator device 100 can be prevented from increasing. That is, in the production method according to the embodiment, a capacitive element having a high capacitance can be monolithically integrated together with an optical element while preventing an increase in device area. In addition, a flat base surface can be formed by the resin layer 41b. Consequently, breakdown voltage uniform across the capacitor 35 can be achieved. Furthermore, a large capacitance can be achieved by using an MIM capacitor as the capacitor. In addition, the electrical potential of the ground electrode connected to the capacitor can be stabilized by connecting between the capacitor and the back electrode of the substrate through the via hole provided in the substrate.

What is claimed is:

1. An optical semiconductor device comprising:
    a substrate having a principal surface and a back surface opposite to the principal surface;
    a first optical waveguide disposed on the principal surface of the substrate, the first optical waveguide extending in a first direction;
    a second optical waveguide disposed on the principal surface of the substrate, the second optical waveguide extending in the first direction, the second optical waveguide being arranged adjacent to the first optical waveguide in a second direction intersecting with the first direction;

a first signal electrode disposed on the first optical waveguide;

a second signal electrode disposed on the second optical waveguide;

a resistor disposed on the principal surface of the substrate, the resistor being arranged between the first optical waveguide and the second optical waveguide, the resistor being electrically connected to the first signal electrode and the second signal electrode;

a resin layer disposed on the principal surface of the substrate, top surfaces of the first and second signal electrodes, and the resistor; and a capacitor disposed on the resin layer, the capacitor being electrically connected to the resistor through an opening of the resin layer.

2. The optical semiconductor device according to claim 1, wherein the second optical waveguide is arranged at a position apart from the first optical waveguide by a distance, and the capacitor has a width larger than the distance between the first and second optical waveguides.

3. optical semiconductor device according to claim 1, further comprising:

a first inorganic film disposed on the resin layer, wherein the capacitor is disposed on the first inorganic film in contact with the first inorganic film.

4. The optical semiconductor device according to claim 1, further comprising:

a ground electrode disposed on the principal surface of the substrate, the ground electrode being electrically connected to the capacitor;

a back electrode disposed on the back surface of the substrate;

a via hole penetrating the substrate from the principal surface to the back surface; and a via electrode disposed in the via hole, the via electrode electrically connecting the ground electrode and the back electrode.

5. The optical semiconductor device according to claim 4, wherein the capacitor includes a first metal layer disposed on the resin layer, a second metal layer disposed on the first metal layer, and an insulating film disposed between the first metal layer and the second metal layer, the first metal layer is connected to the resistor, and the second metal layer is connected to the ground electrode.

6. The optical semiconductor device according to claim 4, wherein the capacitor further includes a first metal layer, a second metal layer, a third metal layer, a fourth metal layer, and a plurality of insulating films, the first metal layer, the second metal layer, the third metal layer, and fourth metal layer are stacked in this order, the insulating films are disposed between the first to fourth metal layers, the first metal layer is electrically connected to the third metal layer, the second metal layer is electrically connected to the fourth metal layer, the first metal layer and the third metal layer are connected to the resistor, and the second metal layer and the fourth metal layer are connected to the ground electrode.

7. optical semiconductor device according to claim 1, further comprising buried layers disposed on side surfaces of the first and second optical waveguides, wherein the first signal electrode and the second signal electrode are disposed on the buried layers.

8. The optical semiconductor device according to claim 1, wherein the first and second optical waveguides constitute a pair of arm waveguides of a Mach-Zehnder modulator, and the first and second signal electrodes constitute a pair of traveling-wave electrodes of the Mach-Zehnder modulator.

9. A method for producing an optical semiconductor device, comprising the steps of:

forming an optical waveguide on a principal surface of a substrate;

forming a signal electrode on the optical waveguide;

forming a resistor on the principal surface of the substrate;

forming a resin layer on the principal surface of the substrate, a top surface of the signal electrode, and the resistor;

forming an opening in the resin layer; and forming a capacitor on the resin layer, wherein the step of forming the capacitor includes a step of forming a first metal layer, a second metal layer and an insulating film disposed between the first metal layer and the second metal layer, and the first metal layer of the capacitor is connected to the resistor through the opening of the resin layer.

10. The method of producing an optical semiconductor device according to claim 9, further comprising the steps of:

forming a via hole passing through the substrate by etching the substrate;

forming a via electrode in the via hole; and forming a back electrode on a back surface of the substrate.

* * * * *